Dec. 7, 1926.  
C. C. DOUGLAS  
1,609,799  
BATTERY SHIELD  
Filed Oct. 9, 1923
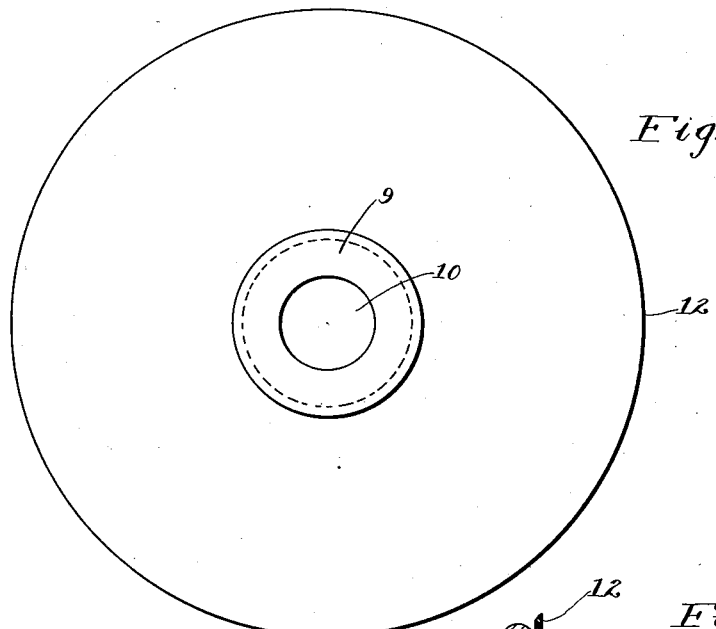
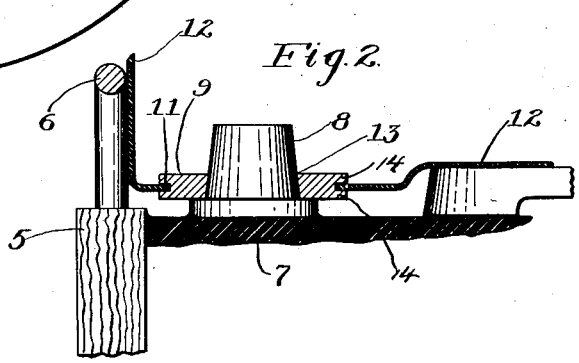
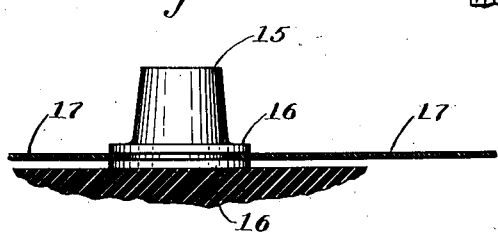
Inventor  
Charles C. Douglas  
by J. Wm Ellis  
Attorney.

Patented Dec. 7, 1926.

1,609,799

UNITED STATES PATENT OFFICE.

CHARLES C. DOUGLAS, OF BUFFALO, NEW YORK.

BATTERY SHIELD.

Application filed October 9, 1923. Serial No. 667,585.

It is well known to those skilled in the art that in storage batteries, the terminals and leads are subject to the corrosive action of the electrolyte of the battery either in the form of fumes coming from the battery, or from the creepage of the electrolyte.

The principal object of my invention has been to provide a shield, which shall extend around the battery terminal post and prevent the electrolyte from reaching the upper part of the terminal post and the battery lead connected thereto.

Another object has been to provide a shield of this nature, which shall be flexible, whereby it may cover a large area of the battery, and still make the filler openings thereof accessible.

Another object has been to provide a shield of this nature which may be conveniently attached to batteries in present day use.

Another object has been the provision of such a device for accomplishing the desired results, which may be inexpensively manufactured.

The above objects and advantages have been accomplished by the device shown in the accompanying drawings, of which:

Fig. 1 is a plan view of my device.

Fig. 2 is a sectional view thereof, showing the same in use.

Fig. 3 shows a sectional view of a modified form of application of the device.

As shown in Fig. 2, 5 represents the storage battery box, and 6 one of the handles thereof. 7 represents the insulation, and 8 one of the terminal posts of the battery. The device, in its preferred form, comprises a washer 9, preferably of lead, which is provided with a central aperture 10 for engagement with the terminal post 8. The washer is provided with an annular groove 11 formed in its periphery, whereby flanges 14 are provided. A sheet of rubber 12, having a central opening is slipped over the washer, and into the groove 11, where it is firmly secured by forcing the flanges 14 of the washer down upon the rubber by a bending operation.

When the device is to be applied to the battery-terminal post 8, the same is slipped over the terminal post 8, and secured in position preferably by caulking around the joint 13, thereby securely sealing the joint between the washer and the terminal post 8. Since my shield is supported by projecting parts of the battery, such as the connector, filler cap, and handle it is obvious that the lower face of the shield will be kept free and separated from contact with the upper surface of the battery, as clearly shown in the drawings.

In the modified form of invention shown in Fig. 3, the terminal post 15 is provided near its base preferably with two flanges 16, between which the rubber shield 17 is disposed and secured by the bending action hereinbefore referred to.

It will be clear from the foregoing that the joints between the shield and the terminal post are efficiently sealed so that all fumes from the battery will be kept from coming in contact with the terminal post and lead of the battery, and the electrolyte will also be prevented from creeping up onto the terminal.

While I have shown my device as applied to a circular terminal post, it is obvious that the washer 9 may be made square, or oblong, and have a central aperture of either of these shapes for adaptation to binding posts of oblong, square, or rectangular cross-section. Furthermore, in the form of invention shown in Fig. 3, the terminal post may be of any desired form, and have flanges arranged at its lower end, or a groove formed therein for the reception of the rubber.

Moreover, while I have described the shield as being made of rubber, I do not wish to limit myself to this material, it being obvious that any suitable acid-resisting material may be used.

While I have described the washer as being attached to the battery terminal post by caulking, it is obvious that, since the battery terminal posts are usually tapered, the hole in the washer may be made of such a size that when forced into position the joint may be effectively sealed. Another way of fastening the washer in position is by fusing the metals of the post and washer together by means of oxyacetylene flame.

Having thus described my invention, what I claim is:

1. The combination with the terminal of a storage battery, of a flexible apertured shield, the shield being so formed that its outer edges are free and unattached and overlap the edge of the battery box.

2. The combination with the terminal and the filler plug of a storage battery, of a flexible apertured shield, the shield being suitably secured to the terminal and made of such a size that it will overlap the filler plug.

3. The combination with the terminal and the filler plug of a storage battery, of a flexible apertured shield, the shield being suitably secured to the terminal and made of such a size that it will be supported by the battery parts and its outer edge substantially free from contact with the top of the battery.

In testimony whereof, I have hereunto signed my name.

CHARLES C. DOUGLAS.